(12) United States Patent
Wilfert

(10) Patent No.: US 7,641,133 B2
(45) Date of Patent: Jan. 5, 2010

(54) CLEANING LANCE

(75) Inventor: Marcus Wilfert, Diedorf (DE)

(73) Assignee: Washtec Holding GmbH, Augsburg (DE)

( * ) Notice: Subject to any disclaimer, the term of this patent is extended or adjusted under 35 U.S.C. 154(b) by 511 days.

(21) Appl. No.: 10/571,620

(22) PCT Filed: Aug. 13, 2005

(86) PCT No.: PCT/EP2005/008833

§ 371 (c)(1),
(2), (4) Date: Mar. 13, 2006

(87) PCT Pub. No.: WO2006/029680

PCT Pub. Date: Mar. 23, 2006

(65) Prior Publication Data

US 2007/0039570 A1 Feb. 22, 2007

(30) Foreign Application Priority Data

Sep. 13, 2004 (DE) ............... 20 2004 014 341 U

(51) Int. Cl.
*F23D 11/16* (2006.01)

(52) U.S. Cl. ............ 239/419.5; 239/311; 239/407; 239/428.5; 239/525; 239/526; 239/533.1; 239/569; 239/310; 239/451; 239/456

(58) Field of Classification Search ............ 239/124, 239/310, 318, 437, 443, 419.5, 428.5, 525, 239/526, 569–571, 586, 311, 407, 412, 451, 239/456, 532, 533.1
See application file for complete search history.

(56) References Cited

U.S. PATENT DOCUMENTS 1,467,807 A 9/1923 Nelson
(Continued)

FOREIGN PATENT DOCUMENTS

DE 231 021 A1 12/1985
(Continued)

OTHER PUBLICATIONS

International Search Report PCT/EP2005/008833, Oct. 24, 2005.
(Continued)

*Primary Examiner*—Steven J Ganey
(74) *Attorney, Agent, or Firm*—Martin Fleit; Paul D. Bianco; Fleit Gibbons Gutman Bongini & Bianco PL

(57) ABSTRACT

The invention relates to a cleaning lance with a nozzle tube (1), on whose outlet-side end there is a discharge nozzle (2), which can be switched by means of a switching mechanism between a high-pressure position and a low-pressure position. In order to be able to perform both the foam application and also the high-pressure wash with such a cleaning lance, without requiring manual switching of the operating function on the cleaning lance itself, it is provided that the nozzle tube (1) has an air inlet (3), which can be closed with a valve (4), wherein the valve function is coupled to the switching mechanism of the discharge nozzle (2), such that the valve (4) closes the air inlet (3) when the discharge nozzle (2) switches from its low-pressure position into its high-pressure position.

11 Claims, 13 Drawing Sheets

U.S. PATENT DOCUMENTS

| | | | |
|---|---|---|---|
| 3,109,594 A | | 11/1963 | Pletcher |
| 4,095,747 A | * | 6/1978 | Anderson .................. 239/443 |
| 4,886,213 A | | 12/1989 | Kristensen |
| 5,242,116 A | * | 9/1993 | Ronezzi ...................... 239/443 |
| 6,015,100 A | * | 1/2000 | Restive .................... 239/428.5 |
| 7,360,721 B2 | * | 4/2008 | Hofer ......................... 239/443 |

FOREIGN PATENT DOCUMENTS

| | | |
|---|---|---|
| DE | 35 44 340 A1 | 6/1986 |
| DE | 43 27 155 C1 | 10/1994 |
| DE | 10257783 B3 | 3/2003 |
| EP | 0 146 795 | 7/1985 |
| EP | 0638 366 A | 2/1995 |
| EP | 0 901 830 A2 | 3/1999 |

OTHER PUBLICATIONS

International Preliminary Report on Patentability PCT/EP2005/008833, Mar. 13, 2007.

* cited by examiner

CLEANING LANCE

FIELD OF THE INVENTION

The invention relates to a cleaning lance for a car wash installation.

BACKGROUND OF THE INVENTION

Such cleaning lances are typically used in SB car wash installations. In such SB washing installations, first foam is applied to the vehicle by means of a foaming brush and then the actual washing of the vehicle is performed with a washing fluid, which is sprayed onto the vehicle under high pressure with a high-pressure lance. This washing process frequently requires that two different lances, namely one lance for applying foam and one high-pressure lance for applying the washing fluid under high pressure, are made available at the SB washing installations. The two lances are respectively supplied with foam or washing fluid via separate supply lines and separate ceiling rotary devices. Therefore the handling is difficult and awkward. In particular, the supply hoses for the foam and for the washing fluid for the two lances interfere with each other and can lead to mix-ups of the supply hoses.

To prevent this result, cleaning lances have already been proposed, which are equipped with two nozzles, namely a foaming nozzle and a high-pressure nozzle, in order to be able to perform both the foam application and also the high-pressure washing with a single lance. Because different nozzle shapes and geometries are necessary for the high-pressure washing and the foam application, for the realization of the desired double function, it is necessary that the cleaning lance can be switched between two positions, namely a first position for the foam application and a second position for the high-pressure washing. For this purpose, from the state of the art cleaning lances with switchable nozzle arrangements are known, with which both the foam application and also the high-pressure washing can be performed. Such nozzle arrangements for cleaning devices, which can be switched between a high-pressure position and a low-pressure position, are known, for example, from DE 102 57 783 B3 and EP 0 146 795 B1.

In the known nozzle arrangements, it has proven to be a disadvantage that switching from the low-pressure position into the high-pressure position must be performed manually. This is because, on one hand, the nozzle arrangements cannot be switched automatically from one position to the other position and, on the other hand, it must also be guaranteed that in the low-pressure position, in which the foam application is to be performed, a supply of air into the cleaning lance should be guaranteed in order to generate a cleaning foam.

Therefore, the invention is based on the problem of presenting a cleaning lance, with which both a foam application and also a high-pressure washing can be performed, without requiring manual switching of the operating function of the cleaning lance on the cleaning lance itself. Furthermore, the cleaning lance should guarantee an effective foam formation within the nozzle tube.

SUMMARY OF THE INVENTION

According to the invention, the named problem with a cleaning lance according to the class is solved in that on the nozzle tube there is an air inlet, which is arranged at a distance to the discharge nozzle and which can be closed with a valve, wherein the valve function is coupled to the switching mechanism of the discharge nozzle, such that the valve closes the air inlet as soon as the discharge nozzle switches from its low-pressure position to its high-pressure position. The arrangement of the air inlet at a distance to the discharge nozzle, which is arranged at the outlet-side end of the nozzle tube, enables a thorough mixing of the air flowing through the air inlet with the cleaning fluid in the region of the reaction and mixing distance formed between the air inlet and the discharge nozzle in the interior of the nozzle tube. Through the formation of this reaction and mixing distance, an effective foam generation is guaranteed.

In a preferred embodiment, on the inlet-side end of the nozzle tube there is a Venturi nozzle, by means of which a pressure difference of the fluid flowing into the nozzle tube is created when the discharge nozzle is located in its low-pressure position. Therefore, an accelerated flow of the incoming washing fluid is generated in the interior of the nozzle tube. This, in turn, promotes the thorough mixing of the air coming in through the air inlet with the washing fluid. The arrangement of the Venturi nozzle and the air inlet in the region of the Venturi nozzle at a distance to the discharge nozzle, in which the switching mechanism for switching the cleaning lance between a high-pressure position and a low-pressure position is arranged, prevents the incoming air from hindering or affecting the switching of the discharge nozzle between the high-pressure position and the low-pressure position.

BRIEF DESCRIPTION OF THE DRAWINGS

In the following, the invention is explained in more detail using an embodiment with reference to the accompanying drawings. Shown in the drawings are.

DETAILED DESCRIPTION OF THE INVENTION

Figure 1:
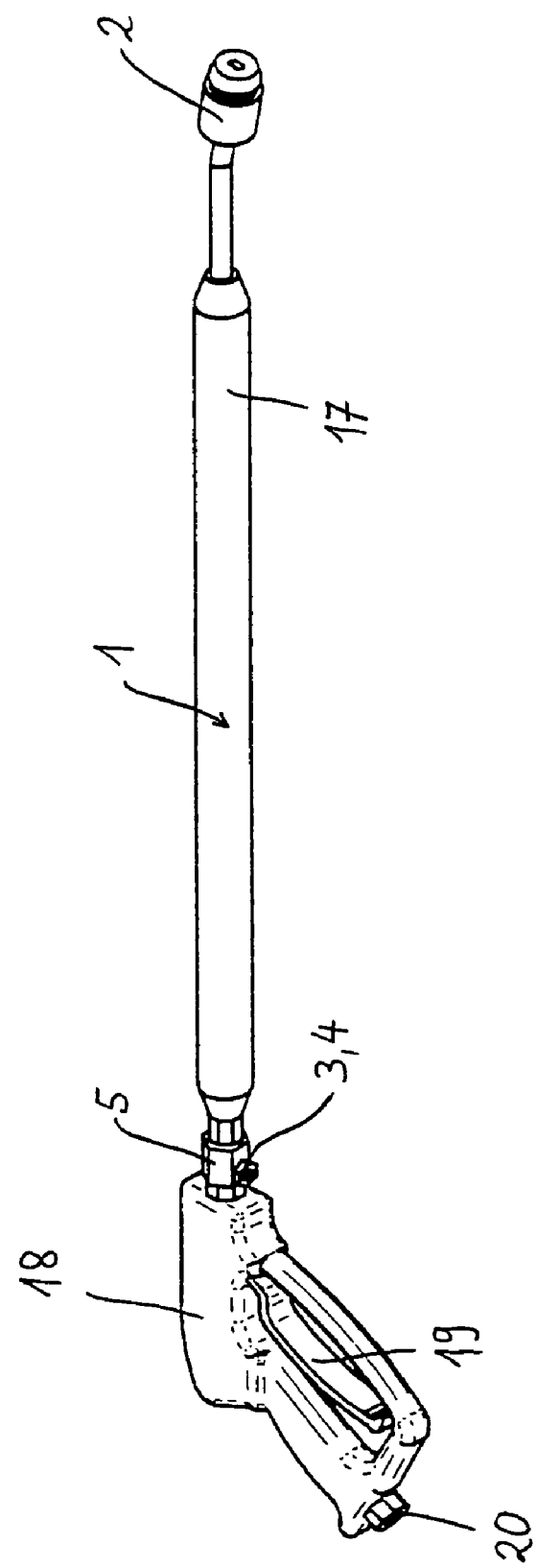
FIG. 1, perspective view of a cleaning lance with a nozzle tube, a discharge nozzle, and an air inlet that can be closed with a valve.

In FIG. 1, a perspective view of a cleaning lance is shown. This includes a nozzle tube 1, which is surrounded in the middle region by a handle shaft 17 and on whose outlet-side end a discharge nozzle 2 is arranged. On the inlet-side end of the nozzle tube 1 there is a throttling nozzle in the form of a Venturi nozzle 5. In the area of the Venturi nozzle 5 the nozzle tube 1 has on its outer side an air inlet 3, which can be closed with a valve 4. On the inlet-side end of the Venturi nozzle 5 there is a handle 18 with a trigger 19. On the bottom side of the handle 18 there is a connection sleeve 20 for connection to a supply line not shown here. The supply line is provided with washing fluid by a high-pressure device not shown here. There is a switch button on the high-pressure device. This button can be used to switch from the foam position to the high-pressure position. In the foam position, the high-pressure device supplies the cleaning lance with a fluid, which is mixed with a foaming agent. In the high-pressure position, the cleaning lance is provided with washing fluid under high pressure.

Figure 2:
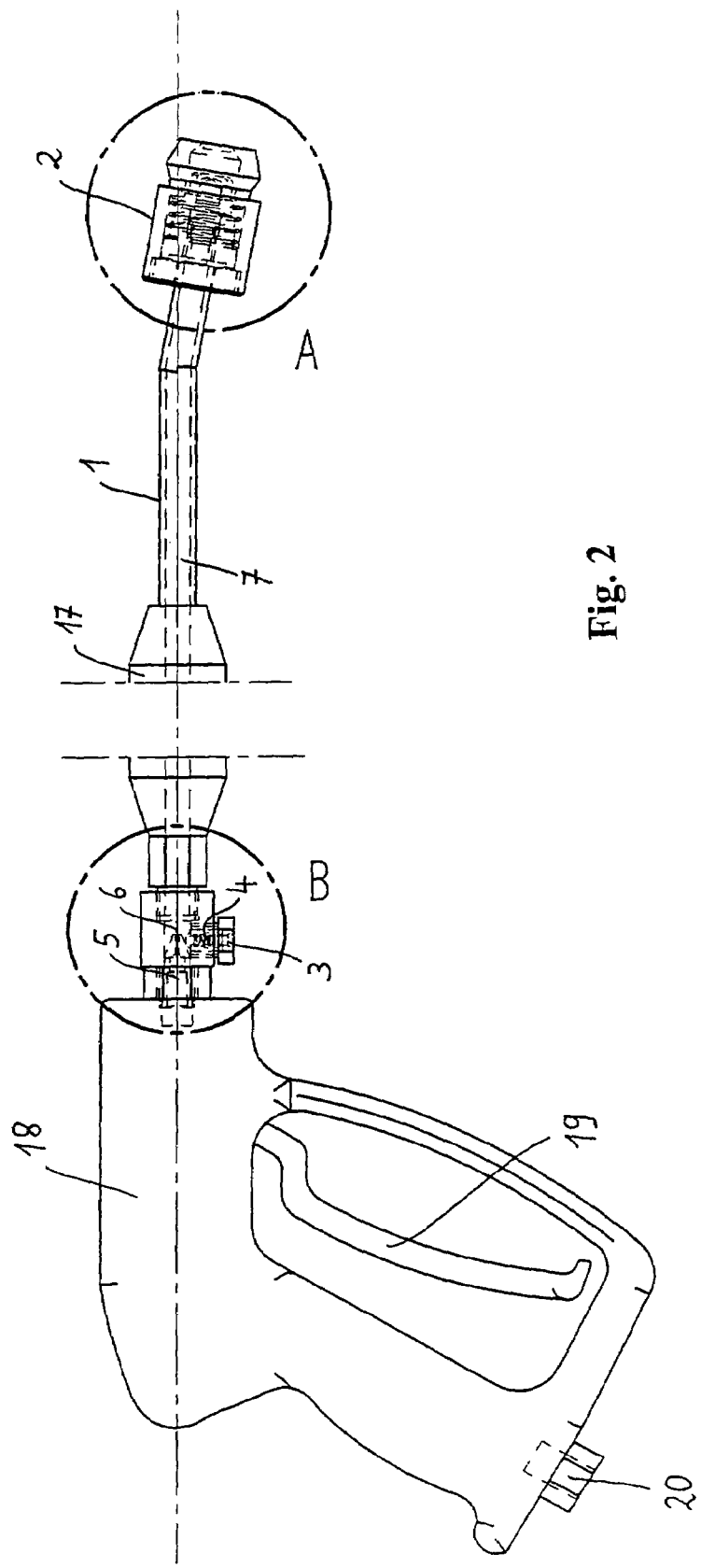
FIG. 2, side view of the cleaning lance of FIG. 1, wherein the nozzle tube is shown shortened and the discharge nozzle and also the air inlet are shown with the valve in section.
Figure 3:
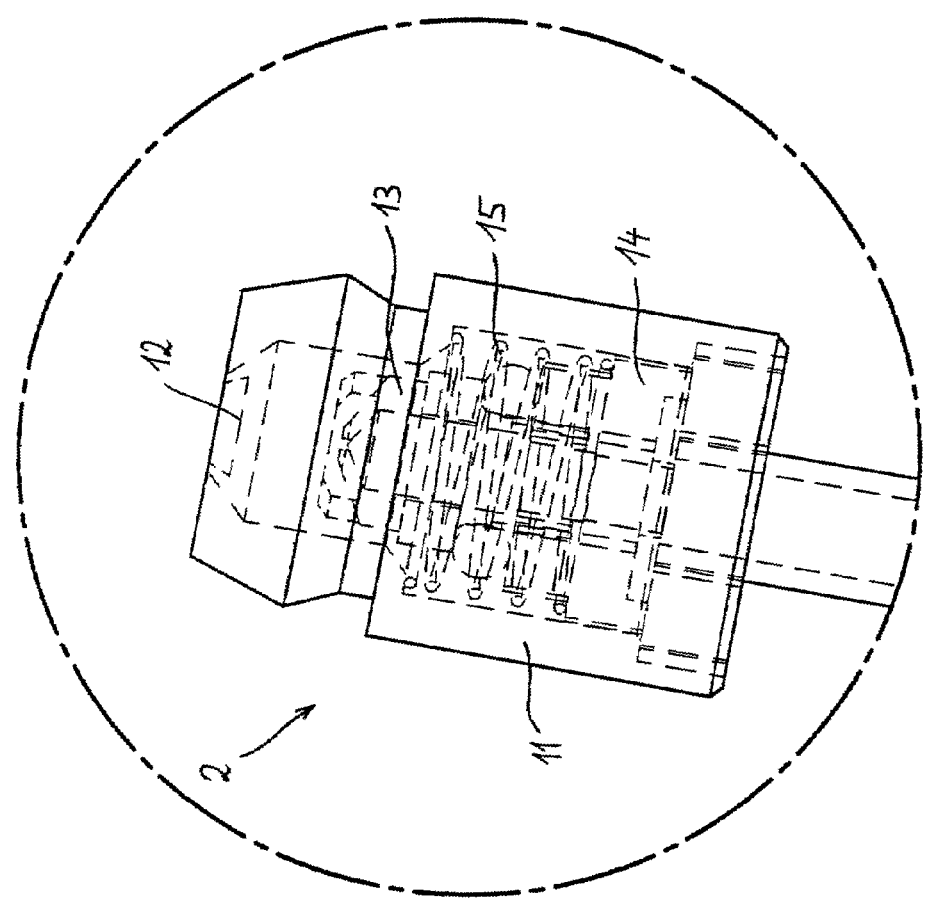
FIG. 3, view of the detail "A" from FIG. 2.

In FIG. 2, the cleaning lance is shown in a side view with shortened nozzle tube 1 and partially in section. From this view, it can be seen that the nozzle tube 1 defines a nozzle channel 7. Furthermore, the arrangement of the throttling nozzle formed as a Venturi nozzle 5 on the inlet-side end of the nozzle tube, as well as the air inlet 3 that can be closed by the valve 4, can be seen. The outlet-side end of the nozzle tube 1 is shown enlarged in FIG. 3 with the discharge nozzle 2 set thereon (designated in FIG. 2 with detail A) and the inlet-side end of the nozzle tube 1 is shown enlarged in FIG. 4 with the Venturi nozzle 5, the air inlet 3, and the valve 4 (designated in FIG. 2 with detail B).

Figure 5:
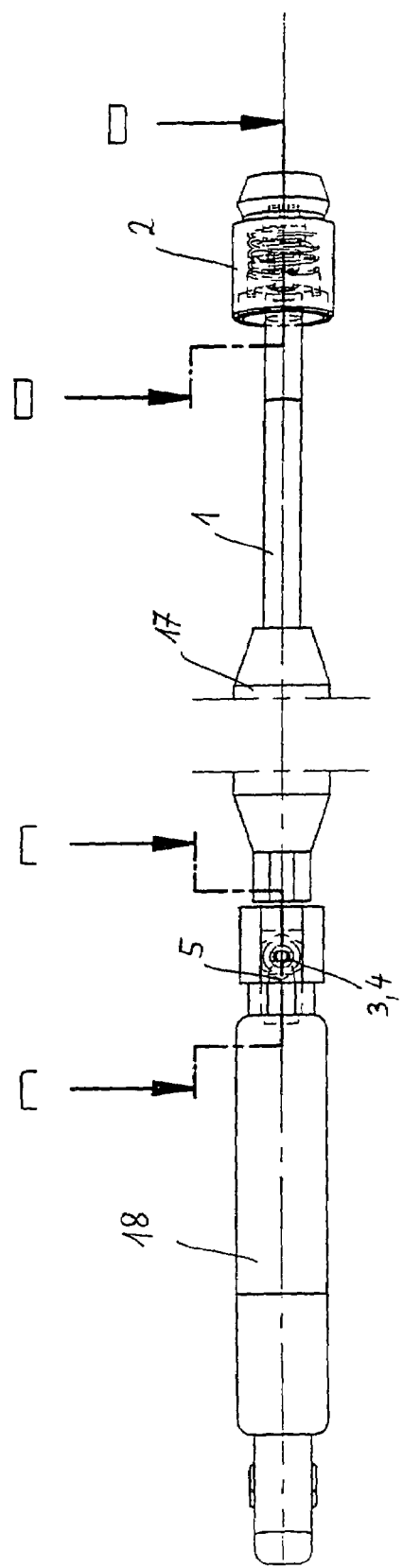
FIG. 5, view of the cleaning lance from FIG. 2, in a view from below.

FIG. 5 shows a view of the cleaning lance, as shown in FIG. 2, from below and in FIGS. 6 and 7 sectional views through the inlet-side end of the nozzle tube along line C-C from FIG. 5 and through the outlet-side end of the nozzle tube 1 along line D-D from FIG. 5 are shown, respectively.

Figure 4:
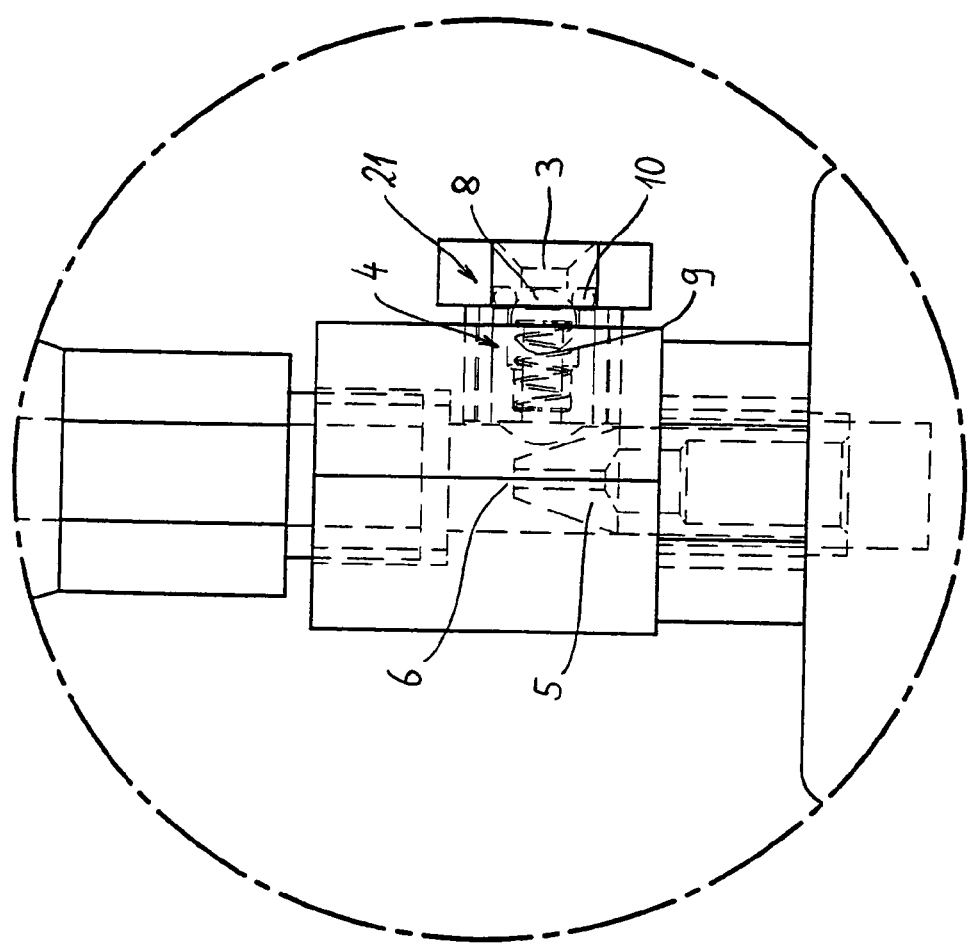
FIG. 4, view of the detail "B" from FIG. 2.
Figure 6:
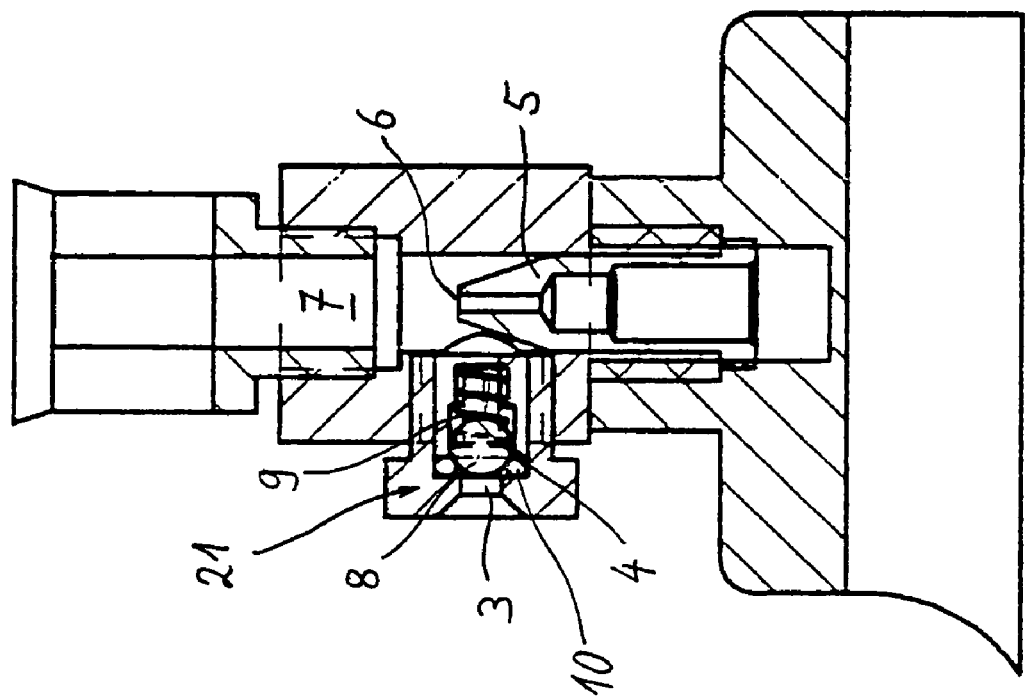
FIG. 6, section view along line C-C from FIG. 5.
Figure 7:
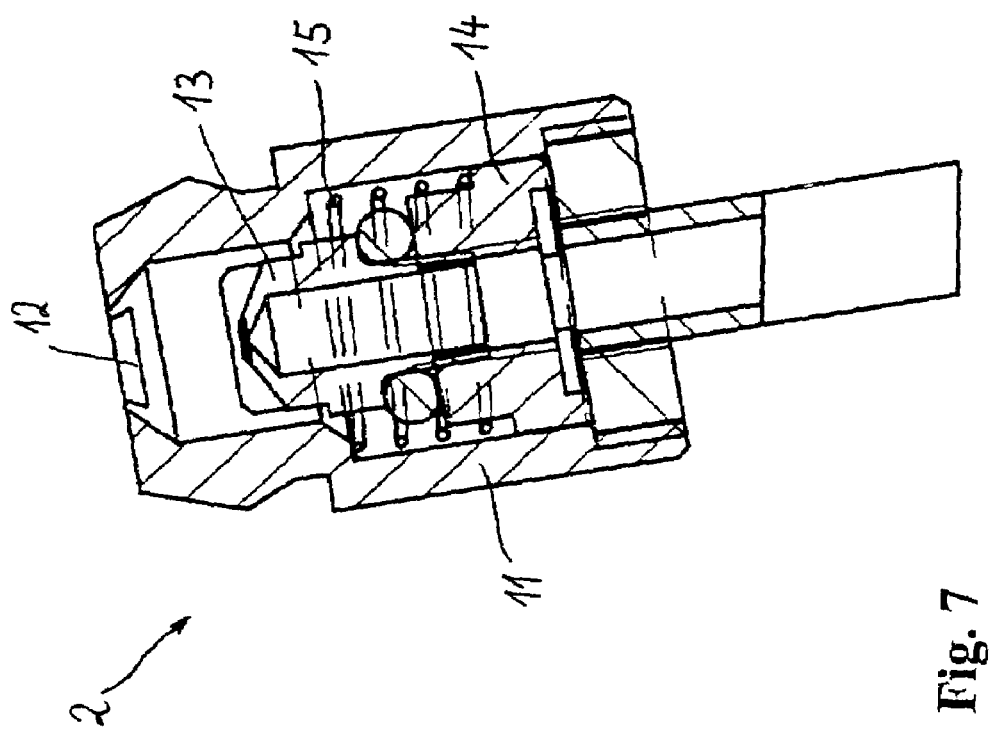
FIG. 7, section view along line D-D from FIG. 5.

From the views of FIGS. 4 and 6, the construction and arrangement of the Venturi nozzle 5, the air inlet 3, and the valve 4 on the inlet-side end of the nozzle tube 1 can be seen. The Venturi nozzle 5, which is inserted on the end into the nozzle chamber 7 at the inlet-side end of the nozzle tube 1, involves a throttling nozzle, which narrows the nozzle cross section of the fluid (washing fluid) flowing into the nozzle channel 7 and therefore leads to an increase of the flow velocity in the area of the outlet 6 of the Venturi nozzle 5. In the area of the outlet 6 of the Venturi nozzle, an insert 21 is inserted in the cylinder shell of the nozzle tube 1. This pot-shaped insert 21 has an opening forming the air inlet 3 in the base of the pot. This opening is closed in the position shown in FIG. 6 by the valve 4. For this purpose, the valve 4 has a closing body 8, which is formed as a ball and which is pressed by the restoring force of a spring 9 against a seal 10, which surrounds the air inlet 3 in the interior of the insert 21. When a force is applied against the restoring force of the spring 9, the closing body 8 is pulled in the direction of the axis of the nozzle channel 7, whereby the air inlet 3 opens and an air inlet channel into the nozzle channel 7 is exposed.

The discharge nozzle 2 arranged on the outlet-side end of the nozzle tube 1 can be switched between two positions, namely a low-pressure position for applying foam and a high-pressure position for high-pressure cleaning of the vehicle. For switching the discharge nozzle 2 there is a switching mechanism. This mechanism can involve a manually activated or automatic switching mechanism. Preferably, an automatic switching mechanism is used, as explained below with reference to the embodiment of discharge nozzle 2 as shown in

FIGS. 7-13.

The described valve function of the valve 4 for opening and closing the air inlet 3 is coupled with the switching mechanism of the discharge nozzle 2, such that the valve 4 closes the air inlet 3 when the discharge nozzle 2 switches from its low-pressure position into its high-pressure position, and such that the valve 4 opens the air inlet 3 when the discharge nozzle 2 is in its low-pressure position. In the low-pressure position, fluid mixed with a foaming agent flows at a relatively low pressure into the nozzle channel 7. Due to the air inlet 3 that is open in the low-pressure position, air simultaneously flows into the nozzle channel 7 and there mixes with the foaming fluid, whereby foam, which finally flows into the discharge nozzle 2, is formed along the length of the nozzle channel 7. If the discharge nozzle 2 switches from its low-pressure position into its high-pressure position, the valve automatically closes the air inlet 3 without the valve 4 having to be activated manually.

Figure 9:
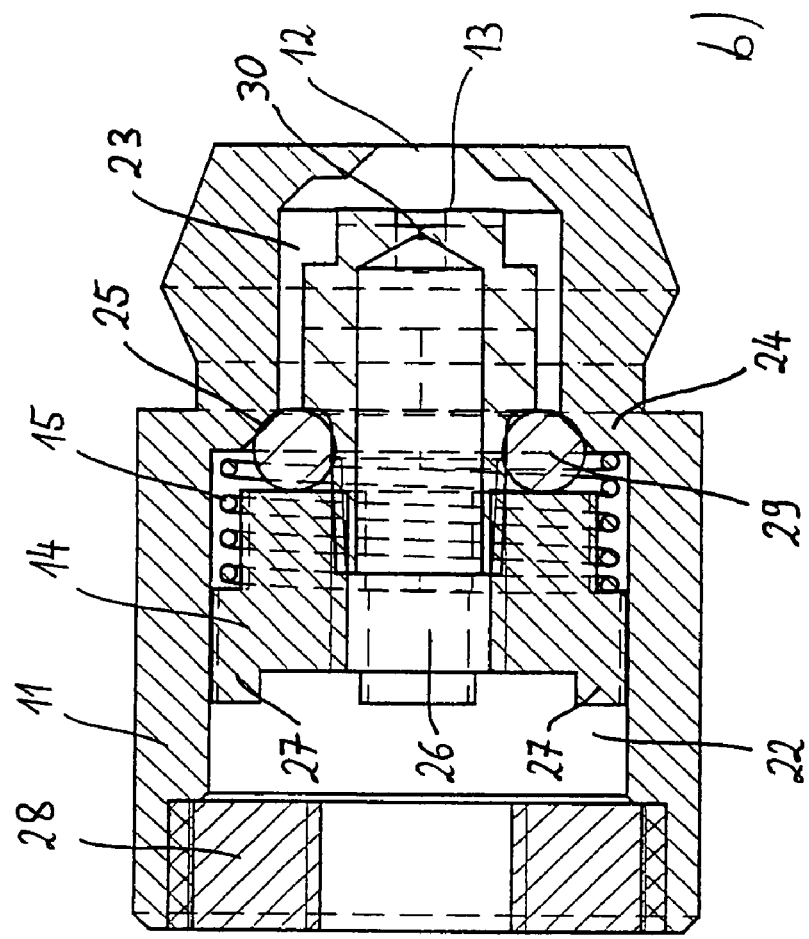
FIG. 9, front view of the discharge nozzle from FIG. 8 (FIG. 9a) and sectional view along line A-A from FIG. 9a (FIG. 9b)
Figure 9:
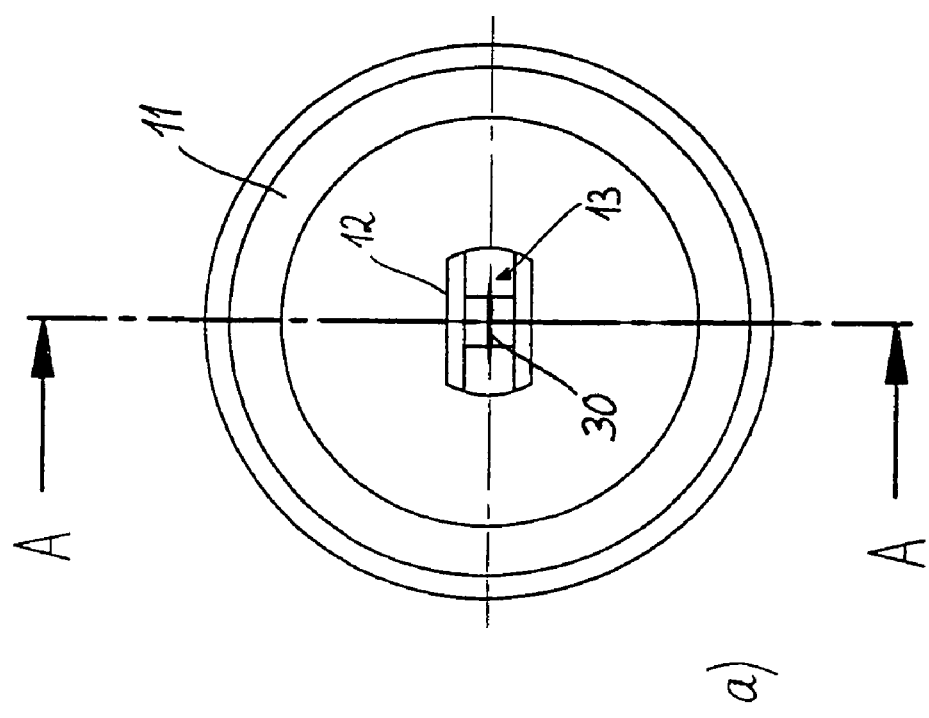
Figure 10:
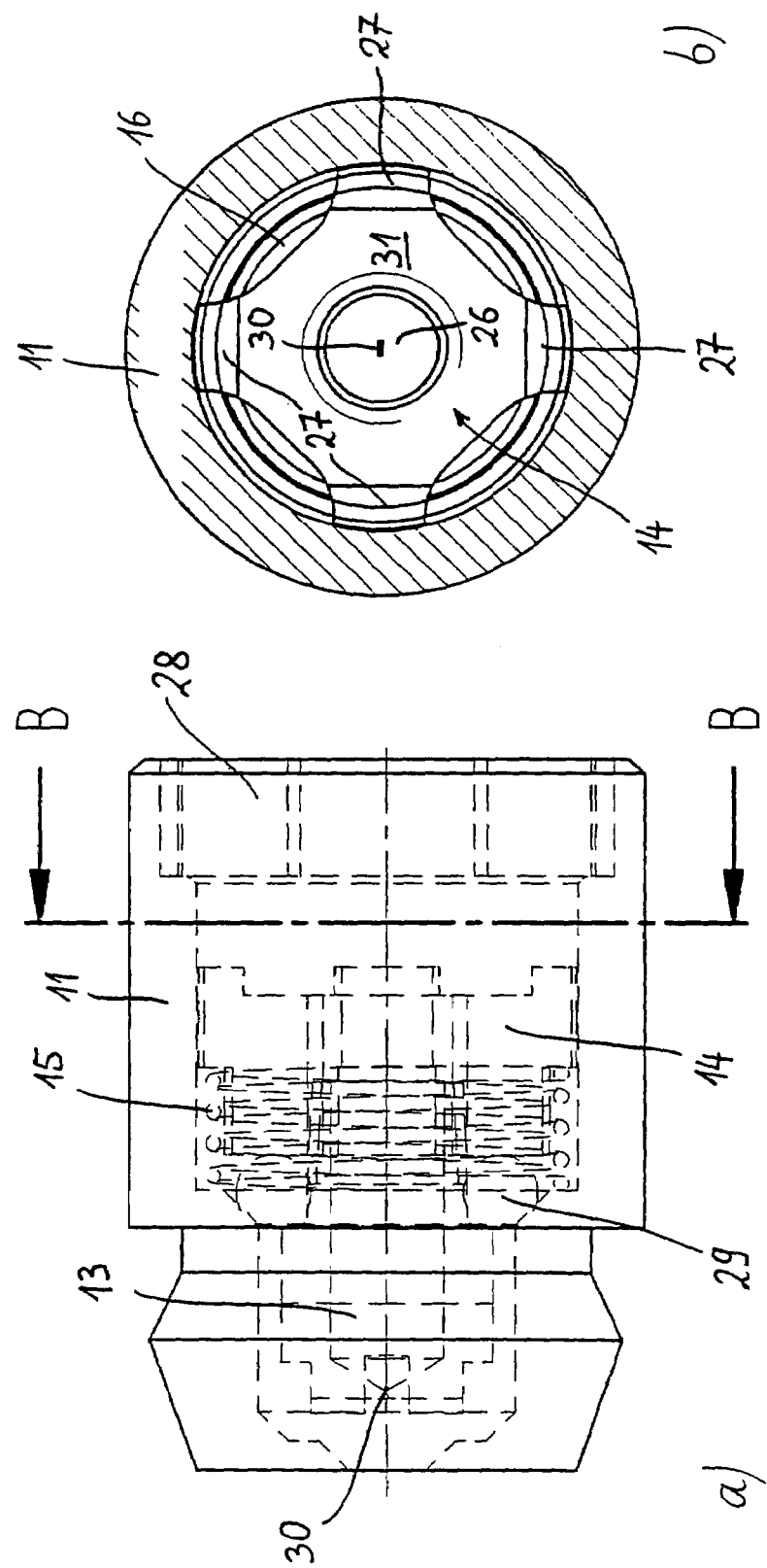
FIG. 10, side view of the discharge nozzle (FIG. 10a) and sectional view along line B-B from FIG. 10a (FIG. 10b)
Figure 11:
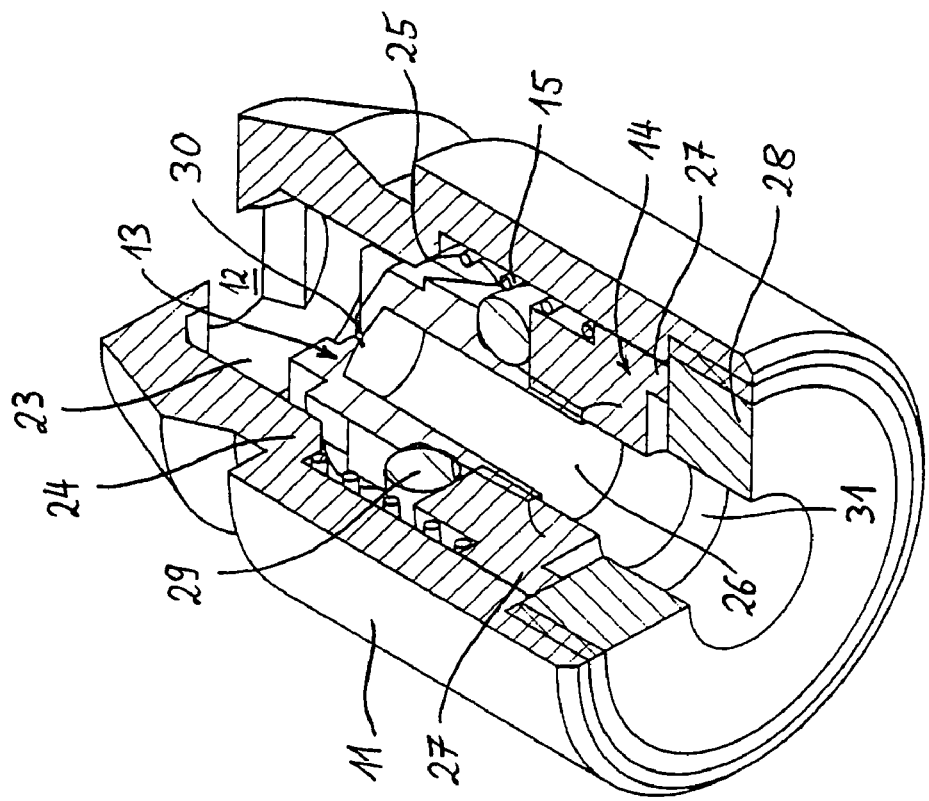
FIG. 11, perspective views of the discharge nozzle in its low-pressure position, partially in section, from two different perspectives.
Figure 11:
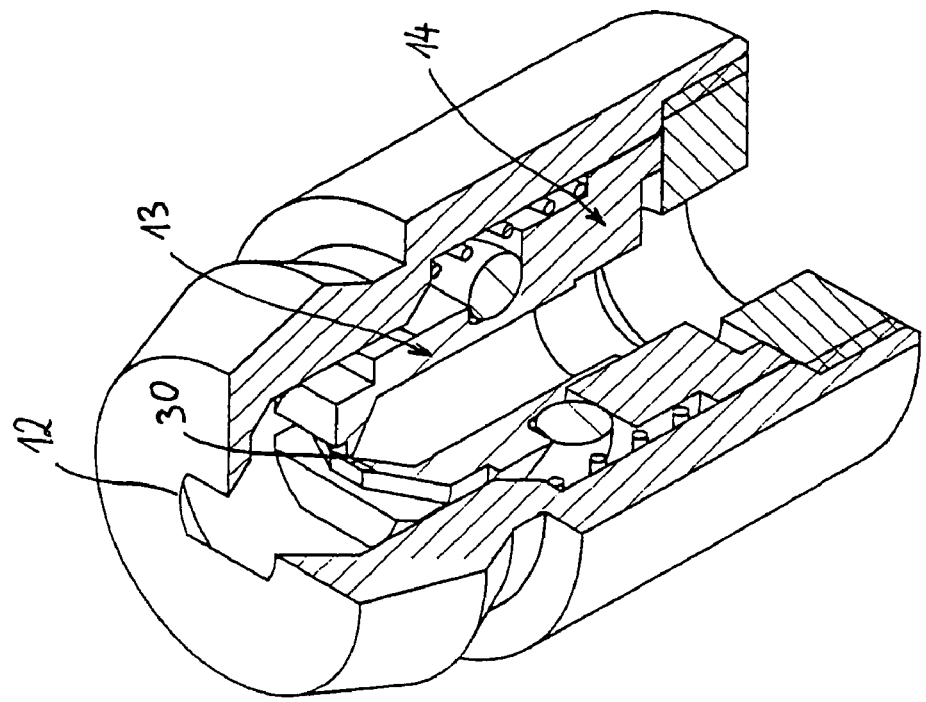
Figure 12:
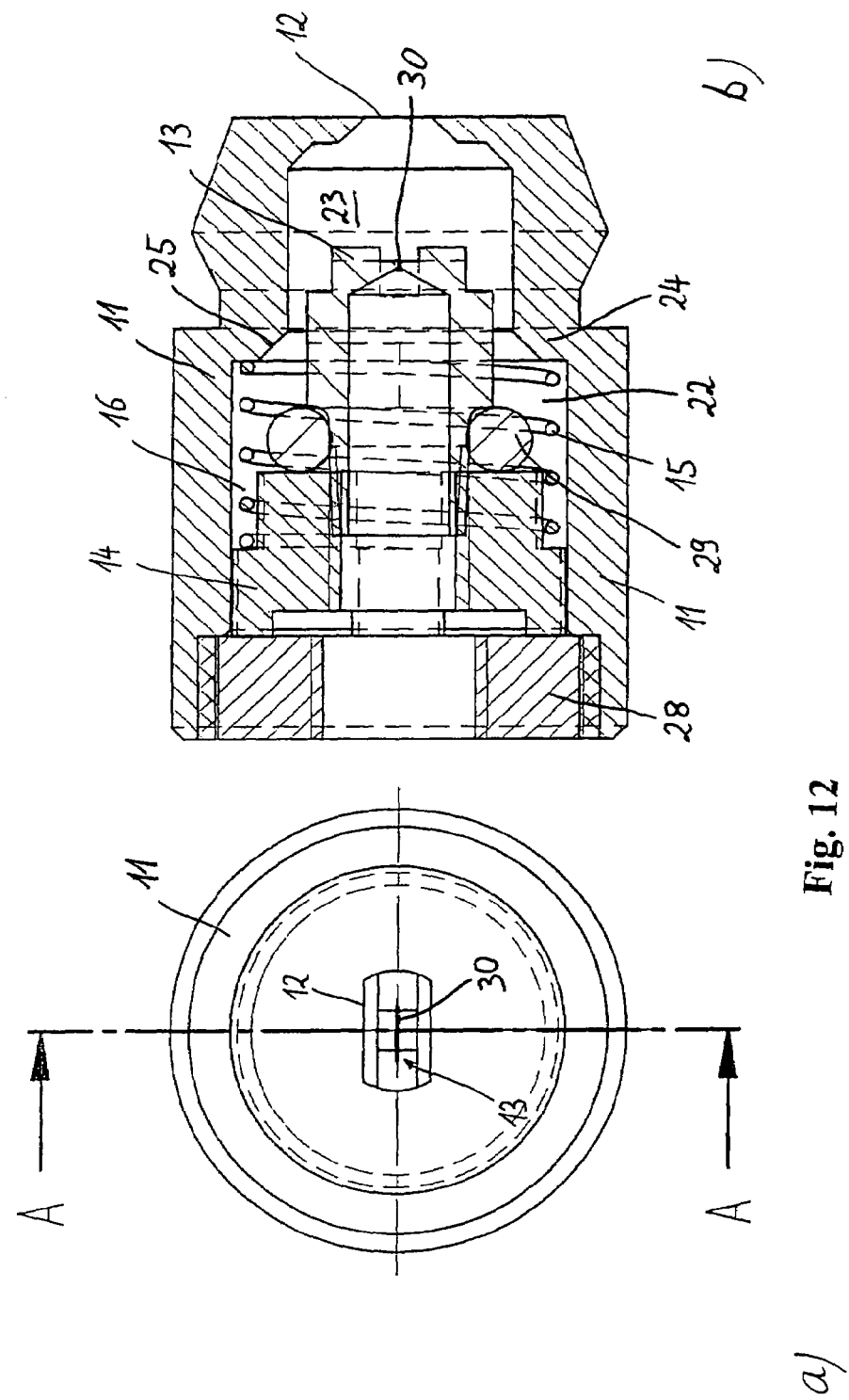
FIG. 12, front view of the discharge nozzle from FIG. 11 (FIG. 12a) and sectional view along line A-A from FIG. 12a (FIG. 12b)
Figure 13:
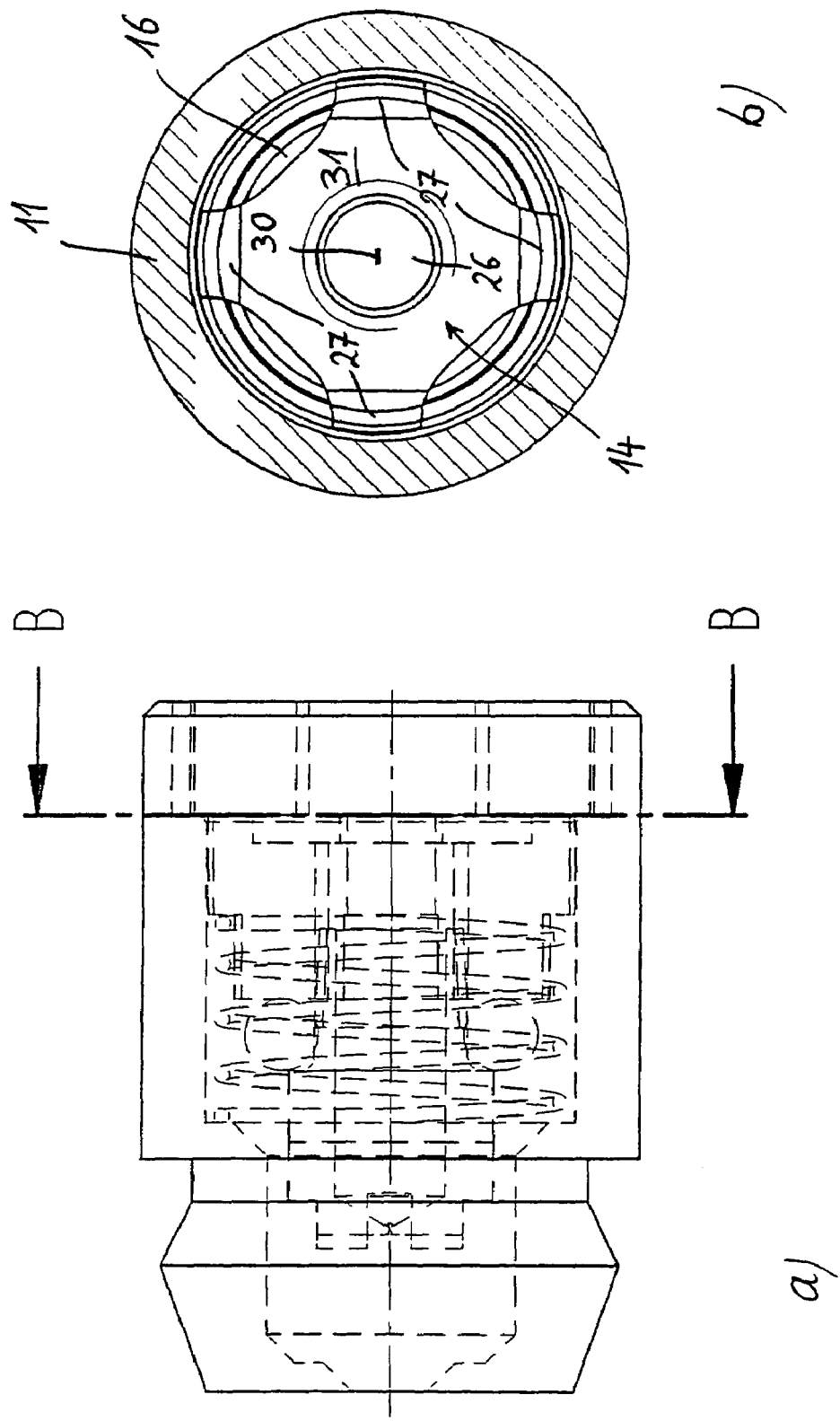
FIG. 13, side view of the discharge nozzle (FIG. 13a) and sectional view along line B-B from FIG. 13a (FIG. 13b).

The switching mechanism for switching the discharge nozzle 2 from its low-pressure position into its high-pressure position (and vice versa) is illustrated in FIGS. 8-13. The discharge nozzle 2 shown there includes a hollow cylindrical nozzle housing 11 with a large nozzle outlet opening 12 arranged on the end of the nozzle housing 11. The nozzle housing 11 has a rear region 22 with larger inner diameter and a front region 23 with smaller inner diameter. The regions 22 and 23 are separated from each other by a shoulder 24, on which a beveled sealing surface 25 is formed. In the rear region 22, there is a piston 14 that can move in the flow direction (longitudinal direction of the nozzle channel 7) in the nozzle housing 11. The piston 14 has a central bore hole 26. In the rear region, four glides 27 distributed over the periphery are formed on the outside of the piston 14. The outer surfaces of these glides 27 contact the inner surface of the rear region 22 of the nozzle housing 11 and enable the piston 14 to glide in the nozzle housing 11. A restoring element 15, which is here formed as a spring, is attached on the front side of the housing. The spring 15 is supported on the shoulder 24 and presses the piston 14 into its rear position, which is shown in FIGS. 11-13. In this position, which is designated below as the low-pressure position, the rear end of the piston 14 contacts the end 28 of the nozzle tube 1, which is screwed into the rear end of the nozzle housing 11.

Figure 8:
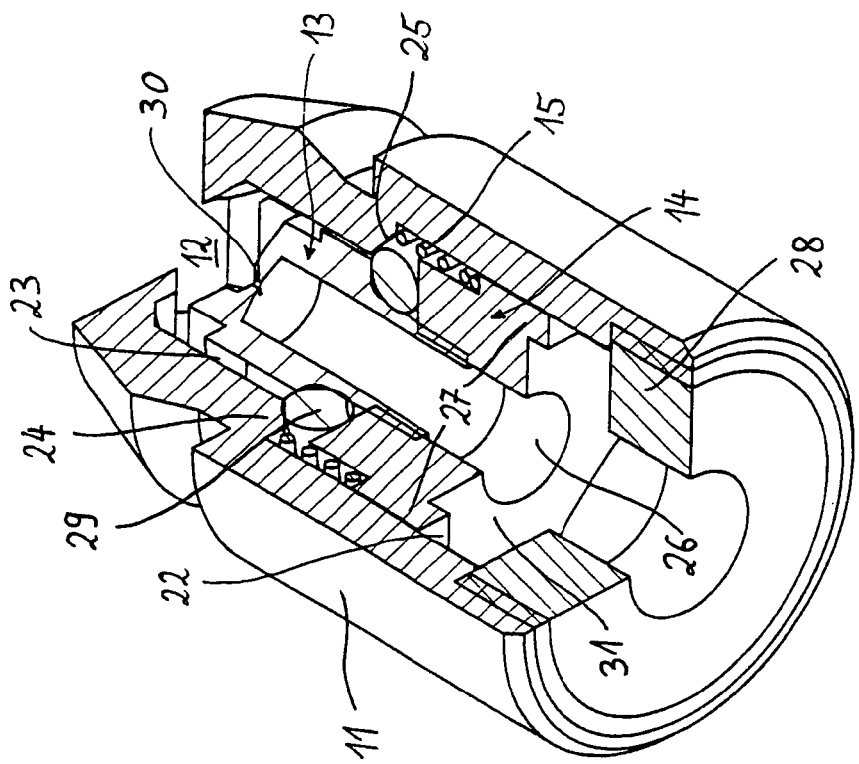
FIG. 8, perspective views of the discharge nozzle in its high-pressure position, partially in section, from two different perspectives.
Figure 8:
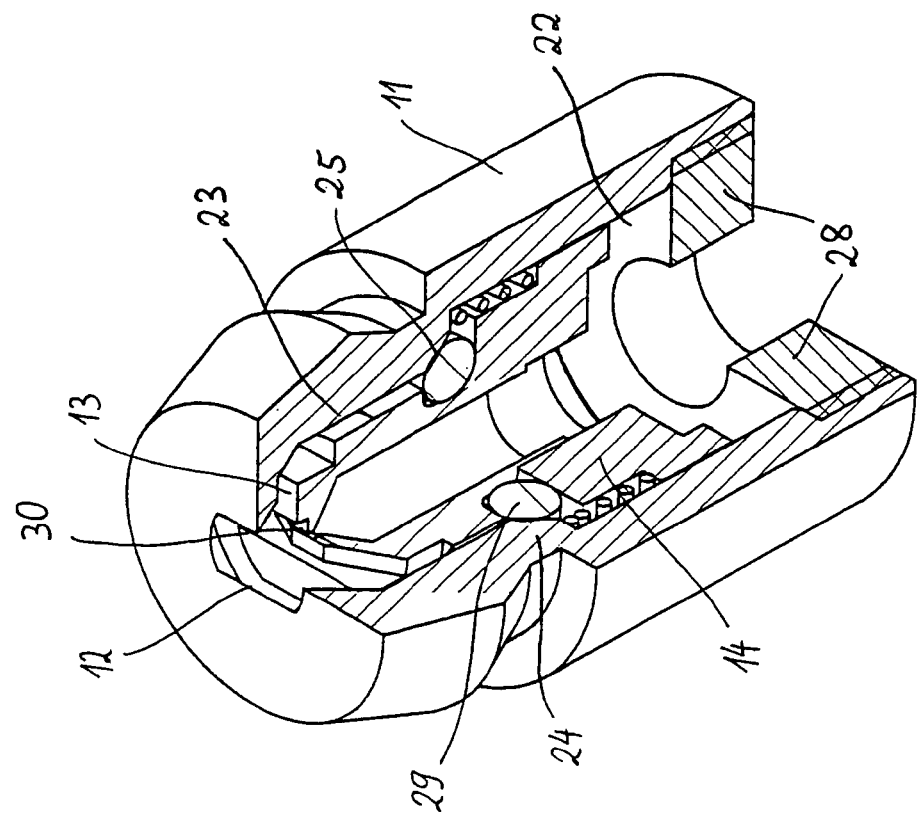

A sealing ring 29 is arranged on the front end of the piston 14. In its front position, which is designated below as the high-pressure position and which is shown in FIGS. 8-10, the piston 14 presses the sealing ring 29 against the sealing surface 25 and in this way seals the rear region 22 from the front region 23 in the nozzle housing 11.

In the front region 23, there is a high-pressure nozzle 13 in the nozzle housing 11. The high-pressure nozzle 13 is screwed into the front end of the piston 14. The high-pressure nozzle has a narrow nozzle gap 30 on its outlet-side end. The narrow nozzle gap 30 is connected to the nozzle channel 7 via the bore hole 26.

The switching mechanism for automatic switching of the discharge nozzle 2 from its low-pressure position into the high-pressure position functions as follows:

In the home position, for a disabled fluid supply, the restoring element 15 presses the piston 14 into its low-pressure position (FIGS. 11-13). Now, if the high-pressure device is set to the foam position, this foam is led through the nozzle channel 7 under low pressure into the discharge nozzle 2. The pressure exerted by the foam on the rear side 31 of the piston 14 is not sufficient to move the piston 14 against the restoring force of the restoring element 15 forwards into the high-pressure position. Therefore, the piston 14 remains in the low-pressure position shown in FIGS. 11-13. In this position, the foam can flow to the nozzle outlet opening 12, on one hand, through the central bore hole 26 and the narrow nozzle gap 30 and, on the other hand, through a ring channel 16 formed between the outside of the piston 14 and the inner surface of the nozzle housing 11.

The ring channel 16, which is free in the low-pressure position and through which the foam can flow from the rear region 22 into the front region 23 of the discharge nozzle 2, is shown especially in FIGS. 12 and 13. The ring channel 16 has a large flow cross section relative to the narrow nozzle gap 30 of the high-pressure nozzle 13 and therefore enables unimpaired flow of the foam through the discharge nozzle 2 to the nozzle outlet opening 12.

Now, after completion of the foam application, if the high-pressure device is switched from the foaming position to high-pressure washing, washing fluid under high pressure flows into the nozzle channel 7 and into the discharge nozzle 2. The high pressure of the washing fluid presses on the rear end 31 of the piston 14 and presses this piston against the restoring force of the restoring element 15 forwards into the high-pressure position. In this position, the piston 14 presses the sealing ring 29 against the sealing surface 25 and thus seals the passage between the rear region 22 and the front region 23 in the nozzle housing 11. In this way, the ring channel 16 is closed and the washing fluid can flow only through the central bore hole 26 into the high-pressure nozzle 13 and finally through the narrow nozzle gap 30. This guarantees that the high-pressure jet flows out as much as possible under high pressure from the discharge nozzle 2. The switching of the discharge nozzle 2 from its low-pressure position into its high-pressure position is forcibly controlled by the pressure of the fluid (washing fluid) flowing into the discharge nozzle 2. After disabling the high pressure (by disabling the high-pressure device or by switching to the foaming position), the piston 14 is pushed back into the rear position, thus the low-pressure position, by the restoring force of the restoring element 15.

Due to the coupling of the valve function of the valve 4 to the switching mechanism of the discharge nozzle 2, the air inlet 3 is also simultaneously closed with the switching of the discharge nozzle 2 from its low-pressure position into its high-pressure position, in that the valve 4 is closed automatically (thus without manual activation). This happens, on one side, by the restoring force of the valve spring 9, which presses the closing body 8 against the seal 10 at the air inlet 3 and thus closes the air inlet 3 air-tight. In addition, the restoring force of the valve spring 9 is increased in the high-pressure position, because a build-up pressure, which presses the closing body 8 with an additional force against the valve seal 10, is formed in the nozzle channel 7.

In contrast, in the low-pressure position, no build-up pressure is formed in the nozzle channel 7, because the foam flowing through the nozzle channel 7 into the discharge nozzle 2 can flow unimpaired through the ring channel 16 and out of the large nozzle outlet opening 12. By means of the throttling nozzle formed as a Venturi nozzle 5, a pressure difference is formed on the inlet-side end of the nozzle tube 1. This pressure difference results in that the fluid flowing into the nozzle channel 7 with low pressure flows in the region of the outlet 6 of the Venturi nozzle with high velocity. Therefore, like for a water jet pump, a force directed into the center of the nozzle channel 7 is exerted on the closing body 8 of the valve 4, which pulls the closing body 8 against the restoring force of the valve spring 9 in the direction of the axis of the nozzle channel 7 and thus opens the air inlet 3. Then air can flow through the air inlet 3 from the outside into the nozzle channel 7, in order to mix there with the fluid mixed with foaming agents for forming foam.

Due to the previously described mechanism, both the foam application and also the high-pressure cleaning of the vehicle can be realized with the cleaning lance according to the invention, without requiring manual switching of the cleaning lance. The change from the foaming position into the high-pressure position is realized just by the user selecting the washing program "foam application" or "high-pressure wash" on the high-pressure device. The discharge nozzle 2 and the valve 4 are then set automatically to the correct position according to the selected washing program.

The invention claimed is:

1. A cleaning lance comprising a nozzle tube, on whose outlet-side end there is a discharge nozzle, which can be switched by means of a switching mechanism between a high-pressure position and a low-pressure position, the nozzle tube having an air inlet, which can be closed with a valve, wherein the valve opens and closes as a function of a position of the switching mechanism of the discharge nozzle so that the valve closes the air inlet when the discharge nozzle switches from its low-pressure position to its high-pressure position.

2. The cleaning lance according to claim 1, wherein on an inlet-side end of the nozzle tube there is a Venturi nozzle, by means of which a pressure difference of a fluid flowing into the nozzle tube is generated when the discharge nozzle is located in its low-pressure position.

3. The cleaning lance according to claim 2, wherein the air inlet opens approximately in the region of the outlet of the Venturi nozzle into the nozzle channel defined by the nozzle tube.

4. The cleaning lance according to claim 1, wherein the valve is formed as a check valve with a closing body, which, in the high-pressure position, is pressed by a restoring force into the air inlet in order to close this inlet.

5. The cleaning lance according to claim 4, wherein the closing body is a ball and that the restoring force is generated by a spring, which presses the ball into an opening that is sealed with a seal and that forms the air inlet, when the discharge nozzle is in its high-pressure position.

6. The cleaning lance according to claim 1, wherein the discharge nozzle includes a nozzle housing with an end nozzle outlet opening, in which a high-pressure nozzle and a piston that can move along the flow direction between a high-pressure position and a low-pressure position are arranged, wherein, when the discharge nozzle is pressurized with high pressure, the piston is pressed by the pressure generated by the incoming fluid into the high-pressure position, in which the incoming fluid is led through the high-pressure nozzle.

7. The cleaning lance according to claim 6, wherein the nozzle housing includes a restoring element, which moves the piston from the high-pressure position into the low-pressure position as soon as the pressure generated by the incoming fluid falls below a preset limit value.

8. The cleaning lance according to claim 6, wherein in the low-pressure position, the incoming fluid flows to the nozzle outlet opening through a ring channel formed between the outside of the piston and the inner surface of the nozzle housing.

9. The cleaning lance according to claim 1, wherein the air inlet is arranged at a distance to the discharge nozzle, in order to enable a mixing length between the air inlet and the discharge nozzle in the interior of the nozzle tube for thorough mixing of the air flowing in through the air inlet with a fluid stream flowing into the nozzle tube.

10. A cleaning lance, comprising:
a nozzle tube having an outlet-side end and having an air inlet formed therein;

a discharge nozzle disposed on said outlet-side end, said discharge nozzle being switchable between a high-pressure position and a low-pressure position;

a switching mechanism connected to said discharge nozzle, said switching mechanism switching said discharge nozzle between said high-pressure position and said low-pressure position;

a valve closing said air inlet;

said switching mechanism being coupled to said valve, said valve closing said air inlet when said switching mechanism switches said discharge nozzle from said low-pressure position to said high-pressure position, the switching mechanism switching the discharge nozzle automatically from said low-pressure position to said high-pressure position when the nozzle tube is supplied with a fluid stream having a pressure exceeding a preset limit value.

11. A cleaning lance comprising:

a nozzle tube having an outlet-side end and having an air inlet formed therein;

a discharge nozzle disposed on said outlet-side end, said discharge nozzle being switchable between a high-pressure position and a low-pressure position;

a switching mechanism connected to said discharge nozzle, said switching mechanism switching said discharge nozzle between said high-pressure position and said low-pressure position;

a valve closing said air inlet;

said switching mechanism being coupled to said valve, said valve closing said air inlet when said switching mechanism switches said discharge nozzle from said low-pressure position to said high-pressure position, the switching mechanism switching the discharge nozzle automatically from said high-pressure position to said low-pressure position when a pressure of a fluid stream flowing into the nozzle tube falls below a preset limit value.

* * * * *